United States Patent [19]

Eldridge

[11] Patent Number: 5,704,400

[45] Date of Patent: Jan. 6, 1998

[54] ELECTRICAL CONDUIT ASSEMBLY

[75] Inventor: Barrett R. Eldridge, Montebello, Calif.

[73] Assignee: Myers Electric Products, Inc., Montebello, Calif.

[21] Appl. No.: 703,502

[22] Filed: Aug. 27, 1996

[51] Int. Cl.[6] ............................................. B65D 59/06
[52] U.S. Cl. ..................... 138/96 T; 138/109; 138/177; 285/32; 174/51; 174/65 R
[58] Field of Search .......................... 138/96 T, 109, 138/117, 120, 177, DIG. 11; 285/31, 32, 212, 220; 174/65 R, 61, 64

[56] References Cited

U.S. PATENT DOCUMENTS

| | | | |
|---|---|---|---|
| Re. 22,713 | 1/1946 | Howe | 285/31 |
| 2,070,296 | 2/1937 | Osborn | 138/96 T |
| 3,104,120 | 9/1963 | Myers | 174/65 R |
| 4,224,464 | 9/1980 | Bunnell et al. | 174/65 R |
| 4,872,338 | 10/1989 | Rivero-Olmedo | 285/32 |

OTHER PUBLICATIONS

Brochure—Myers Scru-Tite Hubs, Myers Electric Products, Inc., Los Angeles, CA—20 pages, Sep. 1996.
Brochure—Myers Scru-Tite Hubs, Myers Electric Products, Inc., Los Angeles, CA—Apr. 1995, 12 pages.

*Primary Examiner*—David Scherbel
*Assistant Examiner*—James F. Hook
*Attorney, Agent, or Firm*—Lyon & Lyon LLP

[57] ABSTRACT

A method of routing rigid electrical conduit pipe between spaced apart enclosures includes measuring the distance between the enclosures and cutting a length of conduit pipe to the measured distance, less a bulkhead hub allowance. Bulkhead hubs are threaded onto each end of the cut length of conduit pipe, to make a conduit assembly. O-rings are contained at the end faces of each bulkhead hub. The conduit assembly is positioned between the enclosures having aligned openings. Inner hubs also having o-rings within a recess are threaded into the bulkhead hubs from the inside of each enclosure, forming a sealed electrical conduit pipe connection between the enclosures.

3 Claims, 4 Drawing Sheets

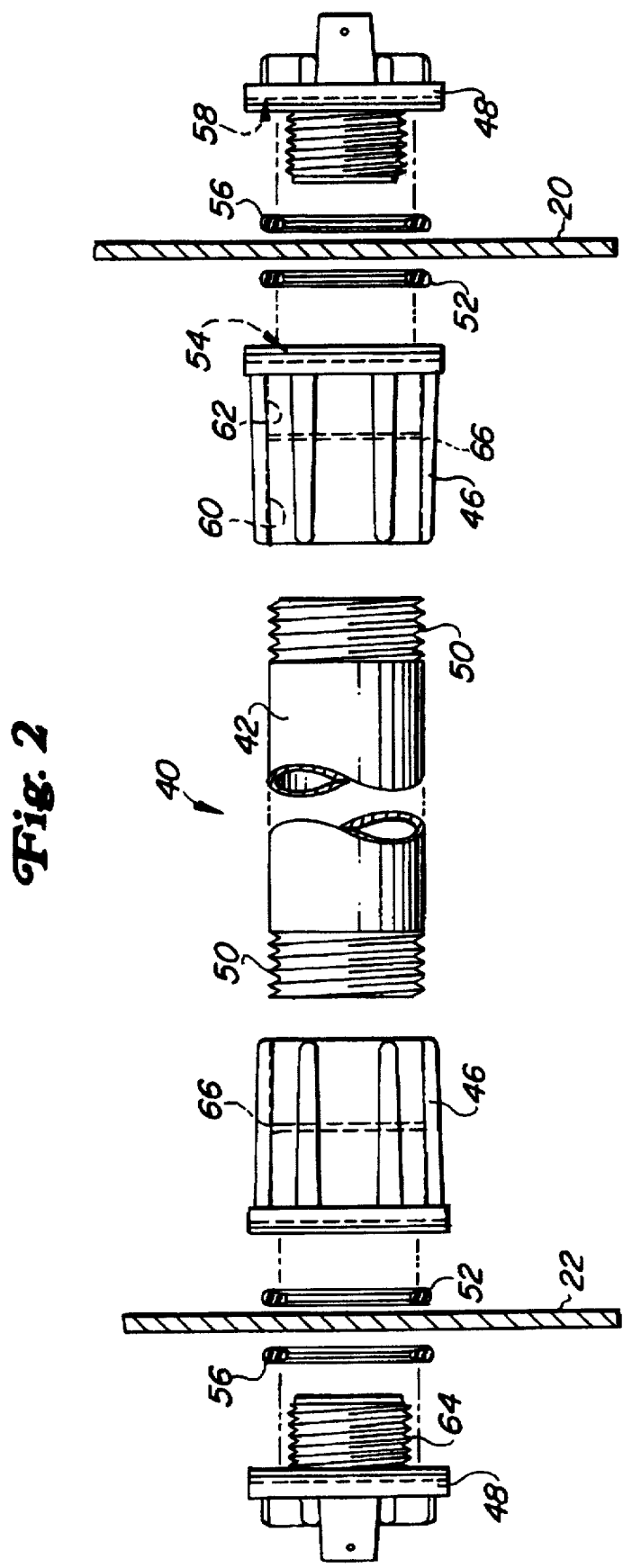

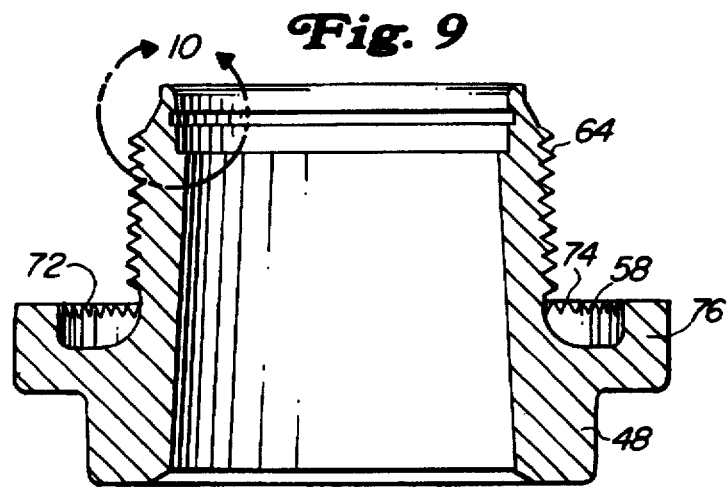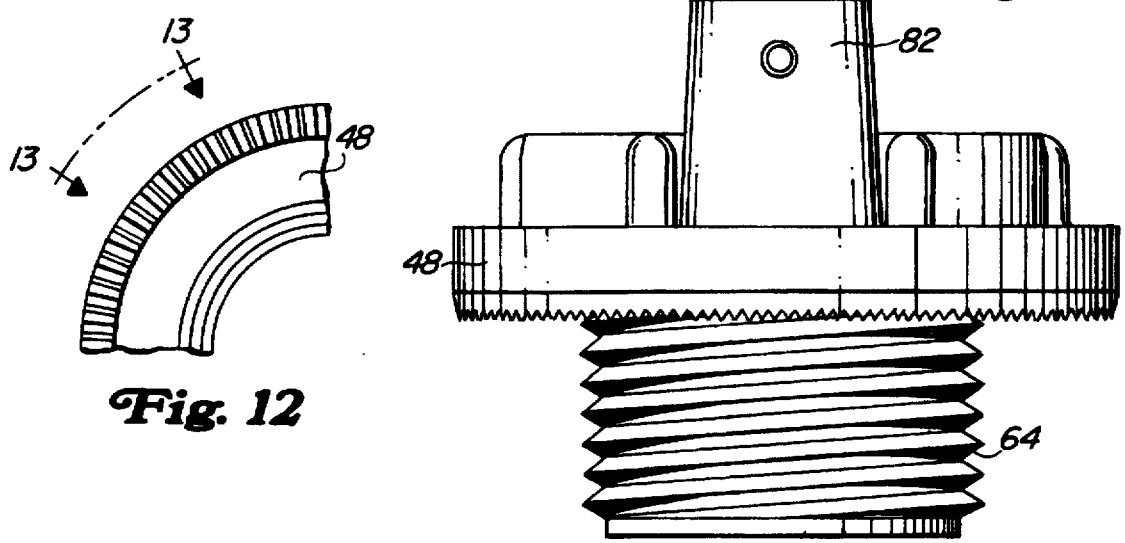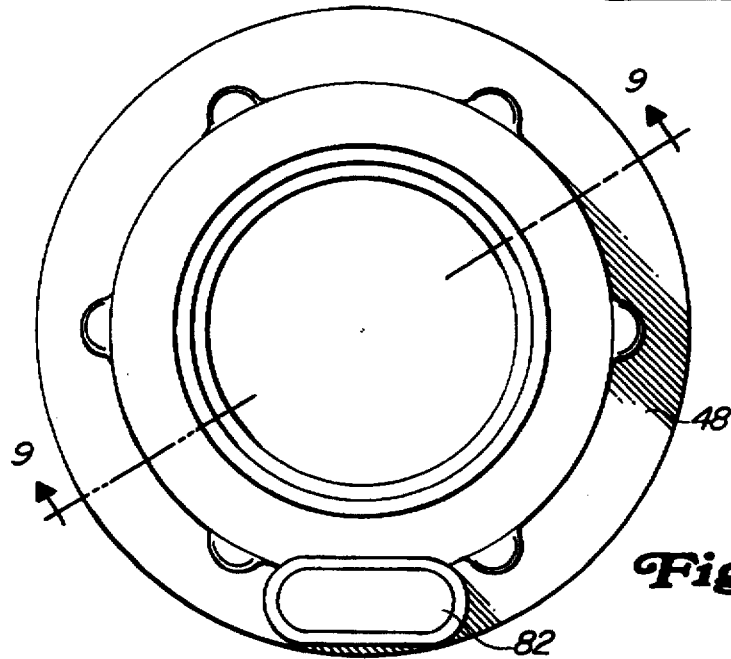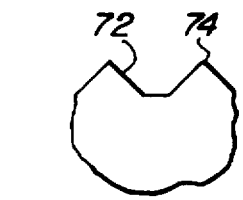

1

ELECTRICAL CONDUIT ASSEMBLY

BACKGROUND OF INVENTION

The field of the invention is wire conduits.

Wire conduits are used in buildings and other facilities to enclose and route electrical wires and cables. In many applications, the conduit must seal out air, water, and dust, especially in pharmaceutical, chemical, food, and pulp/paper processing installations. The conduit is typically a rigid metal pipe. Various hubs are used at the ends of the conduit pipe, to route the wires through a bulkhead, electrical equipment enclosures, or in other applications.

Sheet metal electrical equipment enclosures are frequently used to contain transformers, switches, fuses, junction or terminal bars, and other electrical system components. Often, enclosures are mounted on a wall adjacent to each other, and there is a need to route wires between the enclosures. As the enclosures are attached to the wall and are not readily moved, it has been difficult or impossible to install and seal rigid conduit between enclosures. Accordingly, there remains a need for a product and technique for providing sealed conduit interconnections between enclosures.

SUMMARY OF THE INVENTION

To these ends, a conduit assembly for connecting spaced apart enclosures with rigid conduit includes a conduit pipe having a bulkhead hub at each end. The bulkhead hubs preferably have a seal recess for e.g., an o-ring or washer seal. Inner hubs have sealing rings within a inner seal recess, and threads to engage the bulkhead hubs.

In a preferred method, the distance between spaced apart enclosures is measured. A conduit pipe is cut to a length equivalent to the measured distance, less a bulkhead hub allowance distance. Bulkhead hubs are threaded onto each end of the cut conduit pipe, to form a conduit assembly. The conduit assembly is positioned between aligned openings in the enclosures. Inner hubs are installed from inside the enclosures and are threaded into the bulkhead hubs. O-rings or washers are preferably provided on both sides of the enclosure wall between the inner hub and bulkhead hub, to seal out water, dust, etc.

Other and further embodiments and features will appear hereinafter.

BRIEF DESCRIPTION OF THE DRAWINGS

In the drawing, wherein similar reference characters denote similar elements throughout the several views:

FIG. 2 is an enlarged exploded side elevation view of the conduit assembly of FIG. 1;

FIG. 8 is a rear elevation view of the inner hub of FIG. 2;

FIG. 9 is a section view taken along line 9—9 of FIG. 8;

FIG. 10 is an enlarged section view fragment of the front of the inner hub of FIG. 9;

FIG. 11 is a side elevation view of the inner hub of FIGS. 8 and 9;

FIG. 12 is a front elevation view fragment thereof; and

FIG. 13 is a enlarged side elevation view fragment taken along line 13—13 of FIG. 12.

DETAILED DESCRIPTION OF THE PREFERRED EMBODIMENTS

Figure 1:
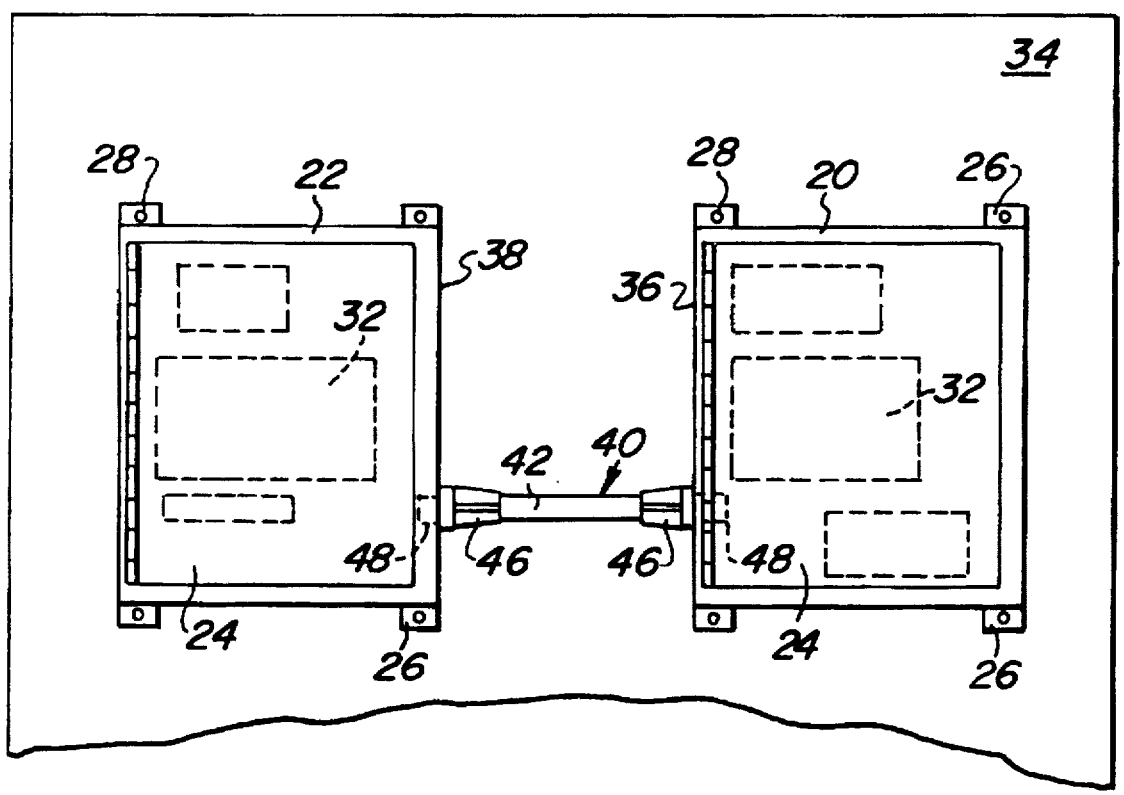
FIG. 1 is a front elevation view of the present conduit assembly installed between electrical equipment enclosures or boxes mounted on a wall.
Figure 4:
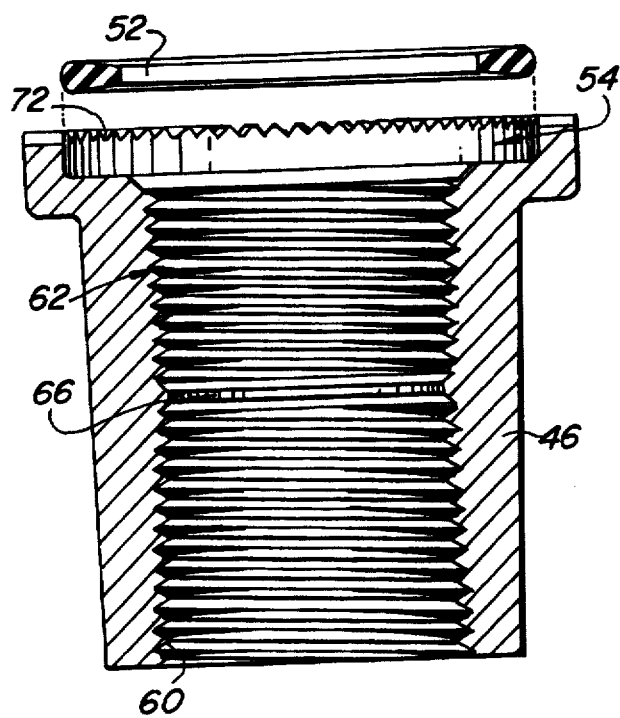
FIG. 4 is a section view taken along line 4—4 of FIG. 3.
Figure 6:
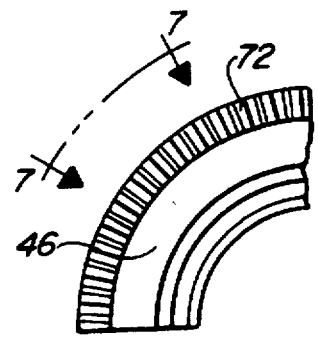
FIG. 6 is a front elevation view fragment of the bulkhead hub of FIGS. 3–5.
Figure 7:
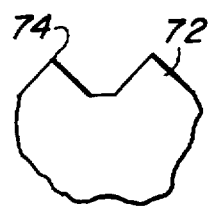
FIG. 7 is an enlarged side elevation view fragment taken along line 7—7 of FIG. 6.
Figure 3:
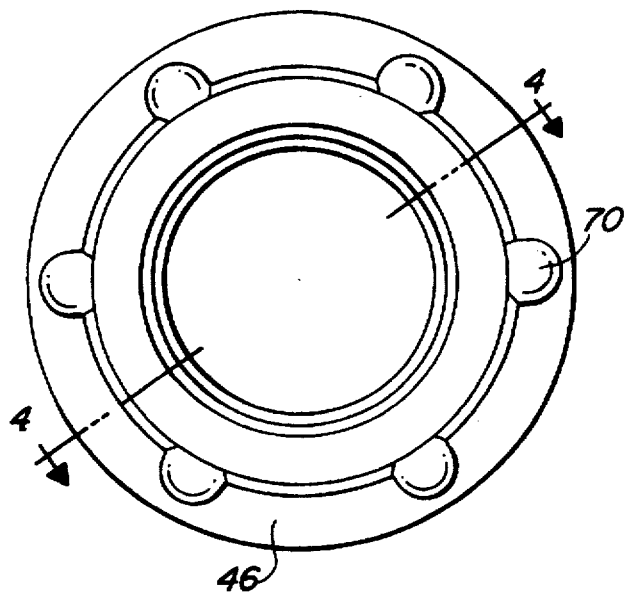
FIG. 3 is a rear elevation of the bulkhead hub of FIGS. 1 and 2.
Figure 5:
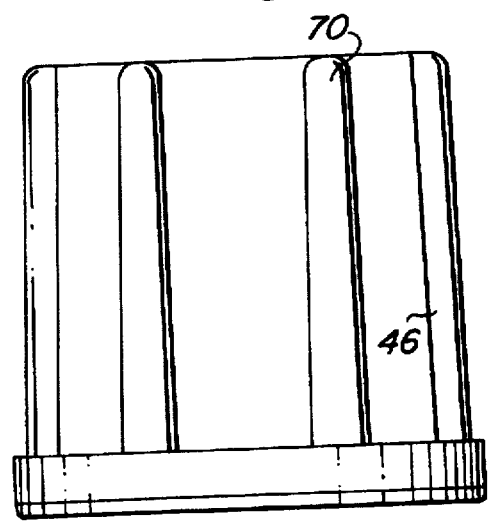
FIG. 5 is a side elevation view of the bulkhead hub of FIGS. 3 and 4.

Turning now in detail to the drawings, as shown in FIG. 1, enclosures or boxes 20 and 22 are mounted on a wall 34 or a backboard via bolts 28 and mounting tabs 26. The enclosures have doors 24 and typically contain various electrical components 32, for example, fuses, circuit breakers, wiring terminals, controllers, etc. The enclosures typically have knockout openings on the top but not on the sides.

Referring to FIGS. 1 and 2, the present conduit assembly 40 includes a rigid pipe 42 having pipe threads 50 at each end. A bulkhead hub 46 is threaded onto each end of the pipe 42. An inner hub 48 threads into the bulkhead hub 46, from inside the enclosure 20 or 22. A bulkhead o-ring or washer 52 is positioned within a bulkhead o-ring seat 54 at the outer end of the bulkhead hub 46. Similarly, on the other side of the sheet metal wall of the enclosure 20 or 22, an o-ring 56 is positioned with an o-ring seat 58.

Referring to FIGS. 3–7, the bulkhead hub 46 has external ribs 70, and internal or female threads 62 spaced apart from internal conduit pipe threads 60 by a separation 66. The bulkhead o-ring seat 54 is formed as an annular recess at the front end face of the bulkhead hub 46. Serrations 72 having points 74 extend from the front end face of the bulkhead hub 46, to make ground contact with the enclosures 20 and 22. The bulkhead o-ring 52 and seat 54 are dimensioned so that the o-ring 52 seals against the bulkhead before the serrations 72 bottom out on the enclosure sheet metal surface. The specific size and threads within the bulkhead hub 46 (as well as in the inner hub 48) vary with the size needed for a specific application. Typical hub diameters range from pipe sizes from ¼ to 6 inches, although other sizes may be used.

Turning to FIGS. 9–13, the inner hub 48 has external inner threads 64 which mate with the internal threads 62 within the bulkhead hub 46. The inner o-ring seat 58 is formed within a collar 76 around the inner hub 48. A grounding lug 82 is provided on the inner hub 48. The front surface of the collar 76 has serrations 72 with points 74, similar to the serrations on the bulkhead hub 46.

In use, with two enclosure vertically aligned as shown in FIG. 1, holes or openings are made in adjacent sides of the enclosures 20 and 22, so that the holes in the enclosures are aligned with each other. The holes may be made via knockout plugs, if provided or otherwise punched, drilled or cut. The distance between the side walls 36 and 38 of the enclosures 20 and 22 is measured. A rigid conduit pipe 42 is then cut to the appropriate length, based on the measured distance between the enclosures. The actual length of the pipe 42 is cut shorter than the measured distance by a predetermined amount (from about 2 to 3 inches in most applications), to account for the length taken up by the bulkhead hubs 46 at each end. With the pipe 42 cut to the appropriate length, a bulkhead hub 46 is threaded onto each end of the pipe 42. The bulkhead o-rings 52 are positioned within the seats or recesses 54 is each bulkhead hub, forming a conduit assembly 40 which is then slid into place between the enclosures and positioned in alignment with the holes in the enclosure side walls 36 and 38. Because the bulkhead hubs 46 at the ends of the conduit assembly 40 have no protruding threads or other projections, and because the pipe 42 is cut to a length resulting in the o-rings 52 being close to flush with the enclosure walls 36 and 38, the conduit assembly 40 may be positioned for installation directly without the need to move or shift the enclosures 20 and 22. Small adjustments in length may be made by turning the bulkhead hubs on the pipe 42, without losing the seal provided by the pipe threads.

With the conduit assembly held in position over the holes in the sidewalls 36 and 38, the inner hubs 48 are installed from the inside of the enclosures 20 and 22, with the external threads 64 engaging the internal threads 62. The o-ring 56 and inner o-ring seat or recess 58 are similarly dimensioned so that the inner o-ring 56 engages and seals against the inside sheet metal surface of the enclosure walls 36 and 38 before the serrations 72 bottom out. With the inner hubs 48 tightened into the bulkhead hubs 46, a sealed connection is made between the enclosure 20 and 22. If necessary, several conduit assemblies 40 may be installed between adjacent enclosures. In addition, the pipe 42 may be bent into different geometries to accommodate misalignment of holes in the sidewalls 36 and 38, or to have connections originating from other surfaces on the enclosures. The bulkhead and inner hubs are preferably made of zinc, aluminum or stainless steel, and in sizes of ½ through 2 inches.

Thus, a novel conduit assembly and method have been shown and described. Various modifications may of course be made without departing from the spirit and scope of the invention. The invention, therefore, should not be restricted except in the spirit of the appended claims.

What is claimed is:

1. An assembly for connecting spaced apart enclosures with rigid conduit, comprising:

a conduit pipe having a first end and a second end;

a first bulkhead hub on the first end of the conduit pipe;

a second bulkhead hub on the second end of the conduit pipe;

the first and second bulkhead hubs each having a generally flat front end around a bulkhead seal recess;

first and second bulkhead hub sealing rings positionable within the bulkhead seal recess in the first and second bulkhead hubs, with the sealing rings projecting beyond any part of the bulkhead hubs;

first and second inner hubs threadable into the first and second bulkhead hubs;

the first and second inner hubs each having a inner seal recess; and first and second inner hub sealing rings positionable within the inner seal recess in the first and second inner hubs.

2. The conduit assembly of claim 1 further comprising male pipe threads on the ends of the conduit pipe engaging female pipe threads on the bulkhead hubs.

3. An assembly for connecting a first enclosure and a second enclosure with rigid conduit when the first and second enclosures a separated by a space, comprising:

a conduit assembly including:

a conduit pipe having a first end and a second end;

a first bulkhead hub on the first end of the conduit pipe;

a second bulkhead hub on the second end of the conduit pipe;

the first and second bulkhead hubs each having a bulkhead seal recess;

first and second bulkhead hub sealing rings in and protruding out of the bulkhead seal recess in the first and second bulkhead hubs, the conduit assembly having a length approximately equivalent to the spree, so that the conduit assembly can slide between the first and second enclosures; and first and second inner hubs threadable into the first and second bulkhead hubs on the conduit assembly;

the first and second inner hubs each having a inner seal recess; and first and second inner hub sealing rings positionable within the inner seal recess in the first and second inner hubs.

* * * * *